Nov. 13, 1951  D. L. GARLAND ET AL  2,575,214
PISTON WITH PLATED PISTON RING GROOVES
Filed Sept. 30, 1948
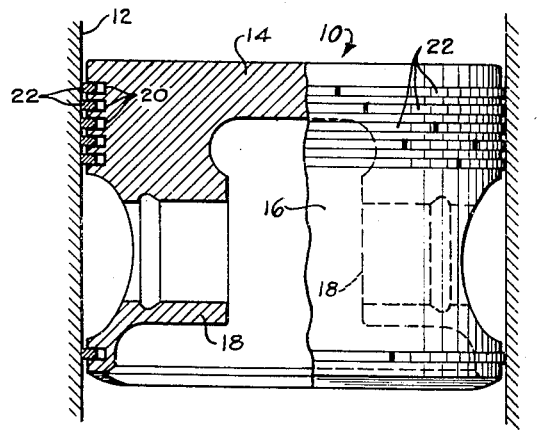
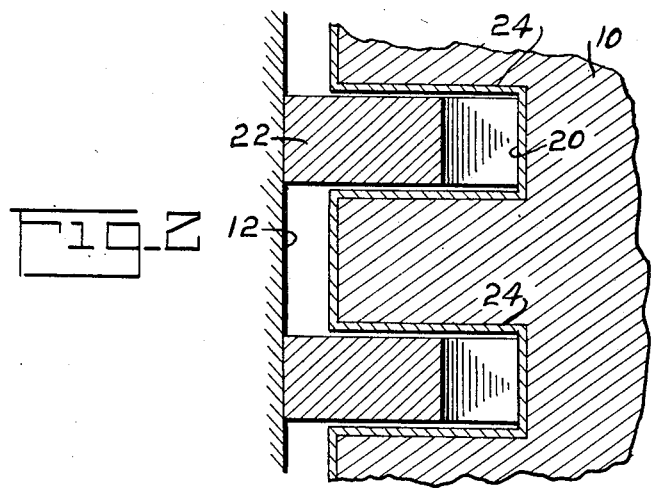
INVENTORS
DANIEL L. GARLAND.
RUSSELL D. GRAY, JR.
BY *Victor D. Behues*
ATTORNEY

Patented Nov. 13, 1951

2,575,214

UNITED STATES PATENT OFFICE 2,575,214

PISTON WITH PLATED PISTON RING GROOVES

Daniel L. Garland, Fair Lawn, and Russell D. Gray, Jr., Haworth, N. J., assignors to Wright Aeronautical Corporation, a corporation of New York Application September 30, 1948, Serial No. 51,912

13 Claims. (Cl. 309—14)

This invention relates to pistons and is particularly directed to a piston having annular grooves for the reception of piston rings.

Engine pistons are generally provided with annular grooves in their cylindrical surfaces for the reception of piston rings, said piston rings being arranged to engage the walls of the cylinder within which the piston reciprocates. Some axial clearance between each piston ring and the side walls of its piston groove is necessary in order to leave the piston ring free to expand and contract radially. Therefore, upon reciprocation of a piston within its cylinder, the piston rings strike or pound against the side walls of their respective piston grooves. In the case of pistons for internal combustion engines, this pounding of the hard piston rings against the side walls of their respective piston grooves is quite severe and, particularly if the piston is made of relatively soft metal such as aluminum or aluminum alloy, said pounding causes wear and even mutilation of the side walls of the piston grooves and their rings. As the piston grooves wear, the axial clearance between each piston ring and the side walls of its groove increases thereby producing a corresponding increase in said pounding action so that ultimately the lands between adjacent piston ring grooves and/or the piston rings may even break. In addition, in the case of pistons of relatively soft metal, hard foreign particles frequently become embedded in the side walls of the piston groove thereby accelerating the wear and possible breakage of the piston rings.

In order to at least minimize this damage to the piston grooves and their rings, it has already been proposed to plate the side walls of the piston ring grooves with chromium in order to provide a hard layer or coating thereover. Chromium, however, must be deposited electrolytically and this requires complicated electro-plating fixtures in order to obtain even an approximately uniform chromium coating over the entire side wall surfaces of each piston ring groove. Furthermore chromium softens under high temperatures such as the temperatures at which the pistons of internal combustion engines operate.

The primary object of the present invention comprises the provision of a piston in which at least the side walls of the piston ring grooves are covered with a hard coating which can readily be applied uniformly, which does not soften at the high temperatures at which pistons of internal combustion engines operate, and which does not scuff under the action of the piston rings. In accordance with the present invention, this objective is attained by providing at least the side walls of the piston ring grooves with a layer or coating of a nickel-phosphorus alloy comprising at least 85% nickel. Such a layer or coating can be and preferably is deposited by the process described in the July 1946 issue of the Journal of Research of the National Bureau of Standards by A. Brenner and G. Riddell in an article entitled "Nickel Plating on Steel by Chemical Reduction" and further described by said authors in the November 1947 issue of said journal in an article entitled "Deposition of Nickel and Cobalt by Chemical Reduction."

Other objects of the invention will become apparent by reading the annexed detailed description in connection with the drawing, in which:

Figure 1 is a view partly in section of a conventional piston and cylinder combination of an internal combustion engine; and Figure 2 is an enlarged sectional view of a portion of Figure 1 illustrating several of the piston ring grooves having a hard outer layer of a nickel alloy in accordance with the present invention.

Referring to the drawing, a piston 10 is disposed within a cylinder 12 for reciprocation therein. The piston 10 comprises a head portion 14 with a hollow cylindrical skirt 16 depending therefrom and with a pair of bosses 18 formed integral with said piston and its skirt for the usual wrist or piston pin (not shown). The outer cylindrical surface of the piston is provided with a plurality of annular grooves 20 and a relatively hard piston ring 22 is disposed within each groove. The piston rings 22 have an axial width slightly less than that of their respective grooves so that said rings are free to expand radially outwardly into contact with the walls of the cylinder 12. As illustrated in the drawing, the piston rings and grooves are all identical and they have been schematically illustrated as being rectangular in cross section. In general this is not the case, however, the specific shape of the piston rings and their grooves forms no part of the invention. The piston 10, as so far described, is a conventional piston for an internal combustion engine and as will appear, the invention is equally applicable to other pistons.

Because of the axial clearance between each piston ring and the side walls of its piston groove, the piston rings strike or pound against the side walls of their respective piston grooves as a result of piston reciprocation and pressure changes in the piston cylinder. This pounding action is particularly severe in the case of internal combustion engines. As already stated, as a result of this pounding action of the piston rings damage to the piston rings and/or the side walls of their grooves may result. This is particularly true if the piston is made of a relatively soft metal such as aluminum or an aluminum alloy.

To prevent this damage to the piston and/or the piston rings at least the side walls of the piston ring grooves are plated with a thin outer layer 24 of a nickel alloy by the process disclosed in the aforementioned articles in the Journal of Research of the National Bureau of Standards. Essentially the process described in the aforementioned articles comprises immersing the metal article to be plated in a bath of a nickel salt and sodium hypophosphite. The bath is heated to at least 170° F., and preferably to 190–200° F. When the metal article to be plated is immersed in said heated bath, catalytic reduction of the nickel occurs on the immersed metal surface of the article. No electric current or electro-plating fixtures are required with this process.

A particular bath found satisfactory for plating on the surface of an aluminum alloy piston is hereinafter described. As discussed in the aforementioned articles, however, the composition of the bath for plating a nickel alloy can be varied considerably. Each such bath, however, contains a nickel salt and sodium hypophosphite and is hereinafter termed a "nickel-hypophosphite bath." As plated by a nickel-hypophosphite bath the nickel alloy has a hardness of approximately 500 V. P. N. (Vickers pyramid number). The hardness and ductility of this nickel alloy can be increased by heat treatment. The hardness of the nickel alloy increases upon heating because of a precipitation hardening phenomenon which takes place in said alloy. The percentage of nickel in the alloy plated by this process will vary with different baths. In any case, however, the percentage of nickel will be greater than 85% and in general will be between 92 and 96%, with the remainder principally phosphorus.

Before an article is plated by this non-electrolytic chemical process it should first be thoroughly cleaned. In plating an aluminum alloy piston the following cleaning procedure has been found satisfactory:

All oil and/or grease are removed from the piston by immersing the piston in or by wiping the piston with a suitable volatile solvent. Preferably the piston is now pre-heated by rinsing in hot water and the piston is then immersed in a chromic-sulphuric acid cleaning solution at 180 to 185° F. for approximately five minutes in order to remove all traces of oxide scale. Ten gallons of this cleaning solution is prepared by adding one gallon of sulphuric acid ($H_2SO_4$) having a specific gravity of 1.84 to at least 5 gallons of water and dissolving 3½ lbs. of chromic acid ($CrO_3$) therein. Then enough water is added to complete the ten gallons. After removal from the cleaning solution, the piston is again thoroughly rinsed with hot water. The invention is obviously not limited to use of this specific cleaning procedure.

After the piston has been cleaned (preferably immediately thereafter) it is immersed in the plating bath. A plating bath made as follows has been found to be satisfactory for plating on an aluminum alloy piston:

Thirty grams of nickel chloride ($NiCl_2.6H_2O$), fifty grams of ammonium chloride ($NH_4Cl$) and one hundred grams of sodium citrate $$Na_3C_6H_5O_7.2H_2O$$

are dissolved in water and enough water is added to make a liter of solution. Sufficient ammonium hydroxide ($NH_4OH$) is then added so as to give the bath a pH value of 8 to 10. When the bath is to be used, it is heated to a temperature of 190 to 200° F. and then ten grams of sodium hypophosphite ($NaH_2PO_2$) are added per liter of solution. The piston 10, having been cleaned by a suitable procedure such as outlined above, is then immersed in said bath whereupon a nickel alloy layer 24 is deposited on said piston. Sodium hypophosphite is periodically added to the bath at the rate of five grams per liter of solution for each hour of plating time. Ammonium hydroxide is also periodically added as the plating proceeds, for example as determined by the color of the bath, so as to maintain the pH value of the bath between 8 and 10. When the bath has a pH value between 8 and 10 its color is dark blue and as its pH value drops below this range its color changes to a greenish blue.

All exposed metal surface portions of the piston which are immersed in the bath will be plated with a nickel alloy layer 24 comprising approximately 92 to 96% nickel with the remainder principally phosphorus. This nickel phosphorus alloy layer is plated to a uniform depth regardless of the irregular nature of the plating surface. Thus the entire wall surface of each piston ring groove is plated with this alloy to a uniform depth as illustrated in Figure 2. If the wall surface of the piston ring groove were to be plated electrolytically, complicated plating fixtures would be required to get any appreciable coating over the bottom wall of the piston ring groove and to prevent the coating from building up excessively at the outer corners of said groove.

With the above described plating bath, the nickel-phosphorus alloy layer builds up on the piston at the rate of approximately .0003″ per hour. It has been found that the nickel alloy layer 24 on the side walls of the piston ring grooves should have a minimum thickness of at least .0003″. This layer may be built up to any desired thickness. No useful purpose is served, however, by making this layer excessively thick and it is necessary that proper axial clearance be provided between each piston ring and the side walls of its groove. Preferably the nickel alloy layer 24 on the side walls of the piston ring grooves has a thickness between .0005 and .0012″.

After the nickel alloy coating or layer 24 has been deposited on the piston and before the piston is used, said layer is preferably hardened above its hardness, as plated, of approximately 500 V. P. N. In the case of an aluminum alloy internal combustion engine piston it has been found satisfactory to heat the piston in air at 450° F. for 30 minutes whereupon the hardness of the nickel alloy layer 24 is increased to approximately 600 V. P. N. This heat treatment not only increases the hardness of the nickel alloy 24 layer but also greatly increases its ductility. This hardened nickel alloy layer 24 retains its hardness and ductility even though the piston is operated at high temperatures. Therefore, by providing the piston ring grooves with this hard and ductile nickel alloy layer 24, the previously described damage and wear of the piston rings and of the side walls of said grooves is greatly minimized.

If the piston is operated at a temperature above that at which it was heat treated, the hardness and ductility of its nickel alloy layer actually increases during engine operation. Thus, pistons of high power aircraft engines operate in the neighborhood of 500° F. so that in the case of such pistons the hardness and ductility of the nickel alloy layer 24 would increase over and above that obtained by the aforedescribed heat treatment at 450° F. The temperatures at which the piston is heat treated obviously should not be so high as to impair the physical properties of the body of the piston. Because of the temperatures at which internal combustion engine pistons operate the nickel alloy layer 24 might become sufficiently hard and ductile during the engine operation without any heat treatment prior to engine operation of the piston. In such cases it may not be necessary to heat treat the nickel alloy layer 24 before the piston is used. Such heat treatment, however, has been found desirable in order that the nickel alloy layer 24 be hard and ductile with the first operation of the piston in an engine.

If only the walls of the piston ring grooves are to be plated, the remaining exposed surfaces of the piston must be suitably insulated from the plating bath—for example by coating said surfaces with a suitable lacquer before the piston is immersed in the plating bath. In the case of a piston for internal combustion engines it has been found desirable and simpler to plate this nickel alloy coating over substantially the entire surface of the piston. If, however, the nickel alloy is plated over the piston skirt 16, this portion of the nickel alloy layer has been found to scuff badly as a result of sliding contact with the walls of its engine cylinder during engine operation. In addition, because of the closeness of the fit of the piston pin in the bores of the piston bosses 18, it also may not be desirable to plate said bores unless said bores have been machined oversize by an amount equal to the thickness of the nickel alloy layer to be plated over the piston surface. Accordingly, the external surface of the piston skirt and possibly the surface of the bores in the bosses 18 are coated with a suitable lacquer before the piston is immersed in the plating bath in order to prevent plating of said surfaces.

As also discussed in the aforementioned articles in the Journal of Research of the National Bureau of Standards, instead of the above described nickel alloy a corresponding cobalt alloy can be plated on a metallic surface by immersing said surface in a bath comprising a cobalt salt and sodium hypophosphite. This is to be expected since the properties of nickel and cobalt are quite similar. The bath for plating a cobalt alloy is essentially the same as that for plating the nickel alloy except a cobalt salt is substituted for the nickel salt thereby making a cobalt-hypophosphite bath. Like the nickel alloy plated by this process, the cobalt alloy is hardenable by heat treatment in air. In addition, the composition of the cobalt alloy is essentially the same as that of the nickel alloy except for the substitution of cobalt for nickel. Nickel is cheaper and more plentiful than cobalt so that it is preferred to plate the walls of the piston ring grooves with a layer of the above described nickel alloy. Obviously, however, it is also within the scope of the invention to plate the walls of the piston ring grooves with the corresponding cobalt alloy. In fact by using a mixture of a nickel-hypophosphite bath and a cobalt-hypophosphite bath a nickel-cobalt alloy will be deposited on metallic surfaces immersed therein.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A piston having an annular groove for the reception of a piston ring, at least one side wall of said groove having an alloy surface layer with a composition comprising principally nickel and phosphorus.

2. A piston having an annular groove for the reception of a piston ring, at least one side wall of said groove having an alloy surface layer, the composition of said alloy layer comprising at least 85% nickel with the balance principally phosphorus.

3. A piston as recited in claim 2 in which said piston groove layer has a hardness at least equal to 600 V. P. N.

4. A piston as recited in claim 3 in which the body of the piston is soft relative to the hardness of said layer.

5. A piston having an annular groove for the reception of a piston ring, at least one side wall portion of said groove having a nickel alloy surface layer with a composition comprising at least 85% nickel and the balance principally phosphorus, said composition and other physical characteristics of said layer being similar to those obtained in plating said layer by immersing said groove wall portion of the piston in a nickel-hypophosphite bath having a temperature of at least 170° F. and heating said piston portion to a temperature sufficient to precipitation harden the nickel alloy plated thereon by said bath.

6. A piston having an annular groove for the reception of a piston ring, at least one side wall portion of said groove having a nickel alloy surface layer with a composition comprising at least 85% nickel and the balance principally phosphorus, said composition and other physical characteristics of said layer being similar to those obtained in plating said layer by immersing said groove wall portion of the piston in a nickel-hypophosphite bath having a temperature of at least 170° F. and then removing said piston portion from said bath and heating said piston portion in air at a temperature of at least 450° F.

7. A piston having a head portion and a cylindrical skirt portion depending therefrom and an annular groove for the reception of a piston ring, a nickel alloy layer covering substantially the entire surface portion of said piston, including the walls of said groove but not including the external surface of said skirt portion, the composition of said layer comprising at least 85% nickel with the balance principally phosphorus.

8. A piston having an annular groove for the reception of a piston ring, at least one side wall of said groove having a surface layer with a composition comprising metal from the group consisting of nickel and cobalt with the balance principally phosphorus.

9. A piston having an annular groove for the reception of a piston ring, at least one side wall of said groove having an alloy surface layer, the composition of said alloy layer comprising at least 85% of metal from the group consisting of nickel and cobalt with the balance principally phosphorus.

10. A piston as recited in claim 9 in which said piston groove layer has a hardness at least equal to 600 V. P. N.

11. A piston having an annular groove for the reception of a piston ring, at least one side wall portion of said groove having a surface layer with a composition comprising at least 85% of metal from the group consisting of nickel and cobalt with the balance principally phosphorus, said composition and other physical characteristics of said layer being similar to those obtained in plating said layer by immersing said groove wall portion of the piston in a metal-hypophosphite bath having a temperature of at least 170° F., said metal being from the group consisting of nickel and cobalt.

12. A mechanism comprising in combination a first member having a groove which, during operation of said mechanism, is subjected to temperatures at least equal to those encountered by the upper piston ring grooves of pistons of internal combustion engines; a second member receivable in said groove and adapted to repeatedly strike against at least one wall of said groove during said operation; at least said one groove wall of said first member having a nickel alloy surface layer with a composition comprising at least 85% nickel and the balance principally phosphorus, said composition and other physical characteristics of said layer being similar to those obtained in plating said layer by immersing said groove wall in a nickel-hypophosphite bath having a temperature of at least 170° F. and heating said groove wall to a temperature sufficient to precipitation harden the nickel alloy plated thereon by said bath.

13. In combination; a piston and cylinder assembly of an internal combustion engine, said piston being made of a material which is primarily aluminum and having an annular groove facing the cylindrical wall of said cylinder; an alloy surface layer over the walls of said groove, said layer having a thickness of at least 0.0003 inch and having a composition comprising at least 85% nickel with the balance principally phosphorus; and a piston ring received within said groove and arranged to engage said cylindrical wall, said ring being made of a material which is hard compared to said piston material; the physical characteristics and composition of said surface layer being similar to those obtained by immersing said groove wall in a nickel-hypophosphite bath having a temperature of at least 170° F. and then removing said piston groove wall from said bath and heating said piston groove wall and the nickel alloy plated thereon in air to a temperature of at least 450° F.

DANIEL L. GARLAND.
RUSSELL D. GRAY, Jr.

REFERENCES CITED

The following references are of record in the file of this patent:

UNITED STATES PATENTS

| Number | Name | Date |
|---|---|---|
| 1,717,750 | Wills | June 18, 1929 |
| 1,975,818 | Work | Oct. 9, 1934 |
| 1,998,496 | Fiedler | Apr. 23, 1935 |
| 2,036,740 | Bengston | Apr. 7, 1936 |